US012429823B2

(12) United States Patent
Helfer et al.

(10) Patent No.: US 12,429,823 B2
(45) Date of Patent: Sep. 30, 2025

(54) BEARING OF AN HOROLOGICAL MOVEMENT, IN PARTICULAR SHOCK-ABSORBING, FOR A ROD OF A ROTATING WHEEL

(71) Applicant: ETA SA Manufacture Horlogère Suisse, Grenchen (CH)

(72) Inventors: Jean-Luc Helfer, Le Landeron (CH); Xavier Berdat, Vicques (CH); Cyril Ruchti, Yverdon-les-Bains (CH)

(73) Assignee: ETA SA MANUFACTURE HORLOGÈRE SUISSE, Grenchen (CH)

(*) Notice: Subject to any disclaimer, the term of this patent is extended or adjusted under 35 U.S.C. 154(b) by 1207 days.

(21) Appl. No.: 17/015,228

(22) Filed: Sep. 9, 2020

(65) Prior Publication Data

US 2021/0080910 A1 Mar. 18, 2021

(30) Foreign Application Priority Data

Sep. 13, 2019 (EP) .................................... 19197379

(51) Int. Cl.
*G04B 31/02* (2006.01)
*G04B 29/04* (2006.01)
*G04B 31/012* (2006.01)

(52) U.S. Cl.
CPC ......... *G04B 31/0123* (2013.01); *G04B 29/04* (2013.01)

(58) Field of Classification Search
CPC ........ F16C 13/04; F16C 13/024; F16C 17/02; F16C 17/10; F16C 2300/12
See application file for complete search history.

(56) References Cited

U.S. PATENT DOCUMENTS

| | | | |
|---|---|---|---|
| 1,907,792 | A | 5/1933 | Greenleaf |
| 2,538,142 | A | 1/1951 | Zürcher |
| 3,478,509 | A | 11/1969 | Marti et al. |

(Continued)

FOREIGN PATENT DOCUMENTS

| | | | |
|---|---|---|---|
| CH | 260 907 | A | 4/1949 |
| CH | 281 191 | A | 2/1952 |

(Continued)

OTHER PUBLICATIONS

Translation of CH 331125, Espacenet, 2023.*

(Continued)

*Primary Examiner* — Renee S Luebke
*Assistant Examiner* — Matthew Hwang
(74) *Attorney, Agent, or Firm* — Sughrue Mion, PLLC

(57) ABSTRACT

An element for radial guiding of a pivot of a rod of a rotating wheel, for example a rod of a balance, for a bearing of an horological movement, in particular shock-absorbing, the guide element including a body configured to cooperate with a bearing unit in such a way as to be maintained in the unit, the body defining a space for radial retention of the pivot, to maintain the rod radially while allowing it to rotate. The radial guide element includes at least three localized radial-bearing parts distributed angularly, the three parts defining the radial retention space, each part having a face for contact with the pivot, each face locally having a cylindrical shape convex towards the inside of the radial retention space, the bearing parts having an elongated body.

13 Claims, 4 Drawing Sheets

(56) References Cited

U.S. PATENT DOCUMENTS

| | | | | |
|---|---|---|---|---|
| 4,143,511 | A | 3/1979 | Bachmann | |
| 8,485,719 | B2 * | 7/2013 | Greubel | G04B 31/0087 368/324 |
| 2006/0215499 | A1 | 9/2006 | Kohler et al. | |
| 2011/0164478 | A1 * | 7/2011 | Conus | G04B 31/0082 368/324 |
| 2015/0192901 | A1 | 7/2015 | Girardin et al. | |
| 2018/0284698 | A1 | 10/2018 | Cettour-Baron et al. | |

FOREIGN PATENT DOCUMENTS

| | | | |
|---|---|---|---|
| CH | 331125 | A * | 6/1958 |
| CH | 706 838 | A2 | 2/2014 |
| DE | 939 359 | C | 2/1956 |
| DE | 11 25 251 | B | 3/1962 |
| EP | 1 921 042 | A1 | 5/2008 |
| EP | 2 781 972 | A1 | 9/2014 |
| GB | 657885 | A | 9/1951 |
| JP | 11-37113 | A | 2/1999 |
| JP | 2012-215548 | A | 11/2012 |
| RU | 2011152177 | A | 6/2013 |

OTHER PUBLICATIONS

Office Action dated Jul. 7, 2021 by the Chinese Patent Office in Chinese Application No. 202010952412.0.

European Search Report 19 19 7379 for Jul. 29, 2020.

Communication dated Feb. 16, 2021, from the Russian Patent and Trademark Office in application No. 2020129832.

Communication dated Sep. 14, 2021, issued by the Japanese Patent Office in application No. 2020-147376.

* cited by examiner

BEARING OF AN HOROLOGICAL MOVEMENT, IN PARTICULAR SHOCK-ABSORBING, FOR A ROD OF A ROTATING WHEEL

CROSS REFERENCE TO RELATED APPLICATIONS

This application is an Utility Application, claiming priority of European Patent Application No. 19197379.1 filed Sep. 13, 2019.

FIELD OF THE INVENTION

The present invention relates to a bearing of an horological movement, in particular shock-absorbing, for a rod of a rotating wheel. The invention also relates to an horological movement provided with such a bearing.

BACKGROUND OF THE INVENTION

In horological movements, the rods of the rotating wheels generally have pivots at their ends, which rotate in bearings mounted in the plate or in bridges of an horological movement. For certain wheels, in particular the balance, it is usual to provide the bearings with a shock-absorbing mechanism. Indeed, since the pivots of the rod of a balance are generally thin and the mass of the balance is relatively high, the pivots can break under the effect of a shock in the absence of a shock-absorbing mechanism.

The configuration of a conventional shock-absorbing bearing 1 is shown by FIG. 1. A drilled jewel 2 provided with a through-hole 7 forming an axial guide element for the pivot, which is usually called bearing, is driven into a bearing support 3, usually called setting, on which an endstone 4 is mounted. The setting 3 is maintained bearing against the back of a bearing unit 5 by elastic means, generally a shock-absorbing spring 6, arranged to exert an axial stress on the upper part of the endstone 4. As shown in FIG. 2, the pivot 9 of the rod 8 is inserted into the through-hole 7. Such a shock-absorbing bearing 1 allows to absorb the shocks along the longitudinal axis of the pivot 9, the assembly formed by the setting 3, the domed jewel 2, and the endstone 4 being able to move via the shock-absorbing spring 6.

However, in the case of inclination of the rod 8 and of the pivot 9, the latter rubs against the edge of the hole 7 if the inner wall of the hole is straight, which can cause premature wear of the pivot 9 because of the very small radius of curvature of the edge in contact, which causes a high contact pressure. To avoid this, it is known to give the shape of an olive to the inner wall of the hole. The inner wall includes a rounded zone intended to ensure a bearing of the pivot on a zone having a large radius of curvature, even if the pivot 9 is inclined.

However, the methods for manufacturing such holes having a rounded inner wall are complex. Indeed, for example a diamond wire passing through the hole is used to plane the inner wall of the hole, the guide element being inclined with respect to the axis of the wire. This method is difficult to implement and does not always allow to obtain a precise and constant result for all the drilled jewels manufactured in series.

SUMMARY OF THE INVENTION

One goal of the invention is, consequently, to propose an element for guiding a pivot of a rod of a rotating wheel, for example a rod of a balance, for a bearing of an horological movement, in particular shock-absorbing, which avoids the aforementioned problems.

For this purpose, the invention relates to an element for radial guiding of a rod of a rotating wheel, for example a rod of a balance, for a bearing of an horological movement, in particular shock-absorbing, the guide element including a body configured to cooperate with a bearing unit in such a way as to be maintained in the unit, the body defining a space for radial retention of the pivot, to maintain the rod radially while allowing it to rotate.

The guide element is remarkable in that it includes at least three parts for localized radial bearing distributed angularly, the three parts defining said radial retention space, each part having a face for contact with said pivot, each face locally having a cylindrical shape convex towards the inside of the radial retention space, the bearing parts having an elongated body.

Thus, via such a configuration, a high precision of the guide elements can be guaranteed. Indeed, it is easier to machine bearing parts distinct from each other than to shape the inner face of a hole to give it a constant particular shape over the entire face.

According to an advantageous embodiment, the axis of revolution of the cylindrical shape is substantially perpendicular to the pivot.

According to an advantageous embodiment, the cylindrical shape entirely covers the contact face of the part.

According to an advantageous embodiment, the bearing parts have an elongated body.

According to an advantageous embodiment, the elongated body is parallelepipedic.

According to an advantageous embodiment, the elongated body is extended longitudinally by an end including the contact face, the end and the body forming a shoulder.

According to an advantageous embodiment, the guide element comprises a support member for said bearing parts.

According to an advantageous embodiment, the support member has slots for insertion of a part of the bearing parts, the slots being arranged radially.

According to an advantageous embodiment, the support member has the shape of a disc, the slots being distributed angularly around the centre of the disc.

According to an advantageous embodiment, the support member is provided with a through-hole arranged above or below the retention space, the hole preferably being disposed at the centre of the support member.

According to an advantageous embodiment, the bearing parts are fixed with respect to the support member.

According to an advantageous embodiment, the bearing parts are fastened to the support member by elastic means capable of absorbing shocks.

According to an advantageous embodiment, the guide element includes silicon, the part being made by a deep reactive-ion etching method of the DRIE type.

According to an advantageous embodiment, the guide element includes a metal, for example nickel, the part being made by a lithography-electroplating-moulding method of the LIGA type.

The invention also relates to a bearing of an horological movement, in particular shock-absorbing, comprising a bearing unit. The bearing is remarkable in that it includes a guide element according to the invention.

The invention also relates to a rotary assembly comprising a rotating wheel of an horological movement, for example a rod of a balance, the wheel being provided with a pivot, characterised in that it includes a radial guide element according to any one of the previous claims, wherein the pivot is maintained radially while being able to rotate.

According to an advantageous embodiment, the pivot includes a conical end cooperating with the bearing parts, the base of the cone having a diameter greater than the diameter of the retention space, so that the pivot is also axially maintained by the guide element.

BRIEF DESCRIPTION OF THE DRAWINGS

Other features and advantages of the present invention will appear upon reading a plurality of embodiments given only as non-limiting examples, in reference to the appended drawings in which.

DETAILED DESCRIPTION OF PREFERRED EMBODIMENTS

Figure 1:
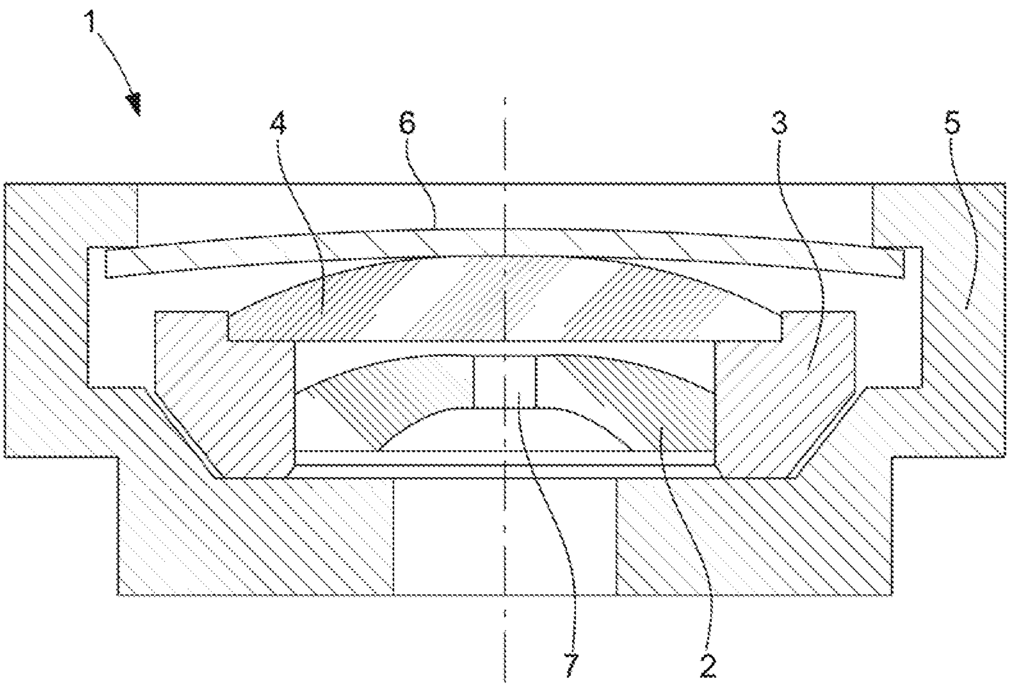
Fig. 1 Prior art
FIG. 1 schematically shows a cross-sectional view of a shock-absorbing bearing and of a rod of a rotating wheel according to an embodiment of the prior art.
Figure 2:
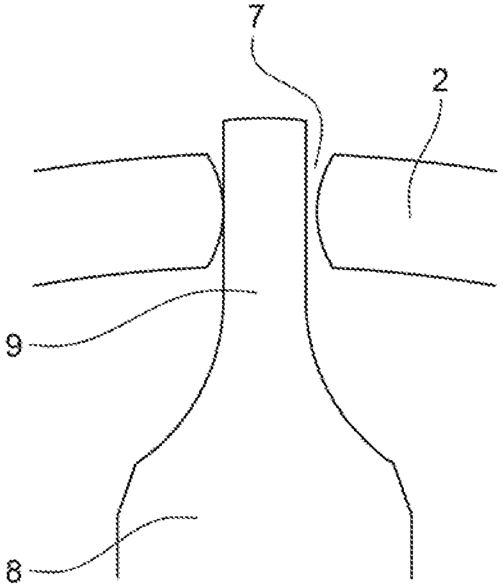
Fig. 2 Prior art
FIG. 2 schematically shows a cross-sectional view of a guide element and of a pivot according to an embodiment of the prior art.

In an horological movement, the bearing is used to maintain a pivot of a rotating wheel, for example a balance rod, while allowing it to carry out rotations about its axis. The horological movement generally comprises a plate and at least one bridge, not shown in the drawings, said plate and/or the bridge including an orifice, the movement further comprising a bearing inserted into the orifice. The bearing is for example a shock-absorbing bearing. The bearing comprises an element for radial guiding of the pivot to maintain it in a direction while allowing it to rotate about its axis, the axis preferably being colinear to the direction.

Figure 3:
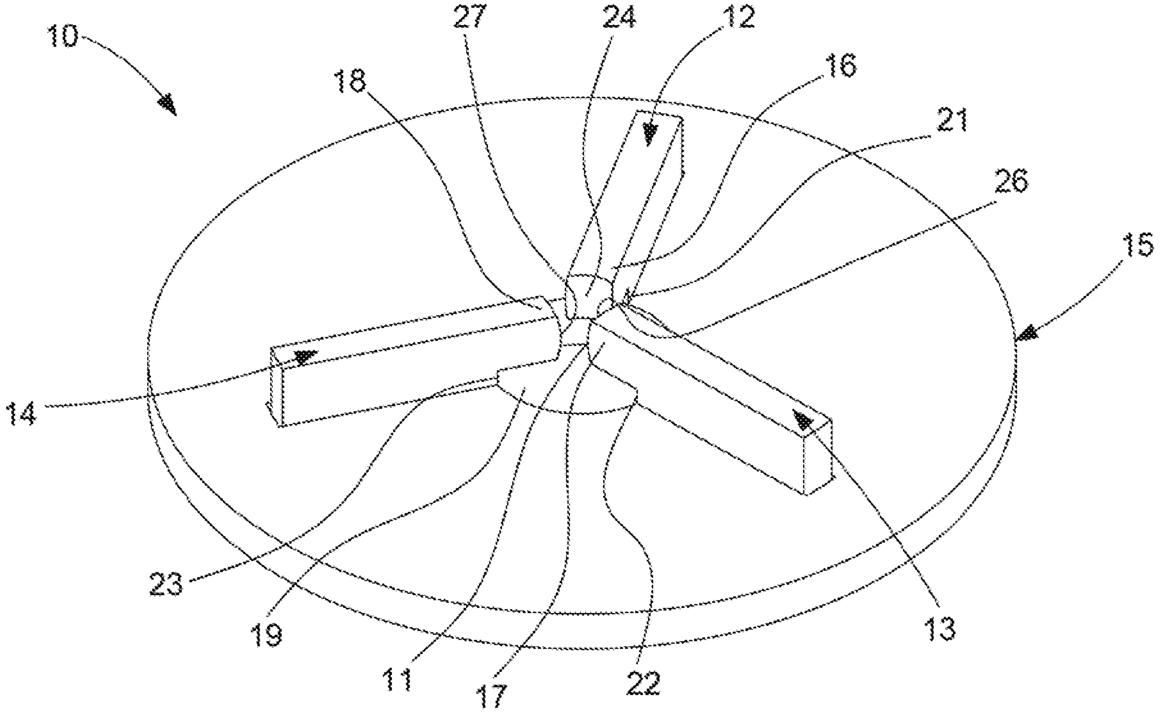
FIG. 3 schematically shows a perspective view of a guide element according to a first embodiment.

FIG. 3 shows a guide element 10 according to the invention. The guide element 10 includes a body configured to cooperate with a bearing unit, not shown in the drawing, in such a way as to be maintained in the unit. The guide element 10 defines, in particular, a space 11 for radial retention of the pivot.

According to the invention, the guide element includes at least three localized radial-bearing parts 12, 13, 14 distributed angularly around the retention space 11, and thus around the pivot when the latter is housed in this space 11. In the embodiments described in the application, the guide element 10 comprises three bearing parts. Nevertheless, embodiments with four, five, six, seven, eight, nine, ten, or even more are also possible. The number of parts depends on the dimensions of the pivot and thus on those of the retention space necessary to house it therein, as well as on the dimensions of the bearing parts.

The bearing parts 12, 13, 14 have a parallelepipedic elongated body. The elongated body is extended longitudinally by an end 16, 17, 18, the end and the body forming a shoulder 21, 22, 23. Each end 16, 17, 18 includes a contact face 24, 26, 27 in order to maintain said pivot radially while defining in part the retention space 11.

Figure 4:
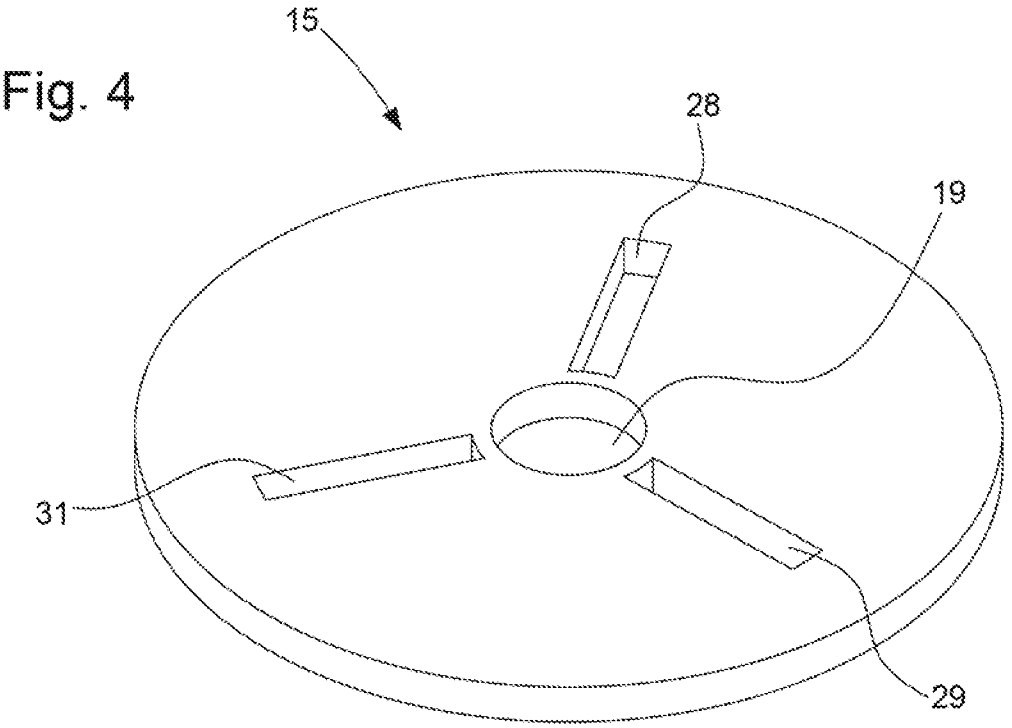
FIG. 4 schematically shows a perspective view of the guide element of FIG. 3 without the bearing parts.

The guide element 11 comprises a support member 15 for said bearing parts 12, 13, 14. Here, the support member 15 has the shape of a disc provided with a through-hole 19 disposed at the centre of the support member 15, below the retention space 11 in the drawing. As indicated in FIG. 4, the support member 15 comprises slots 28, 29, 31 for insertion of a part of the bearing parts 12, 13, 14. The slots 28, 29, 31 are angularly distributed around the centre of the disc, and thus of the through-hole. In this embodiment, the bearing parts 12, 13, 14 are fixed with respect to the support member 15. The bearing parts 12, 13, 14 are inserted into the slots 28, 29, 31, substantially up to the shoulder 21, 22, 23, so that the ends 16, 17, 18 extend from the slots 28, 29, 31 above the through-hole 19.

In another embodiment, not shown in the drawings, the bearing parts are fastened to the support member by elastic means capable of absorbing shocks. The elastic means comprise, for example, a flexible part of the parts, the flexible part being inserted into the slot.

Figure 5:
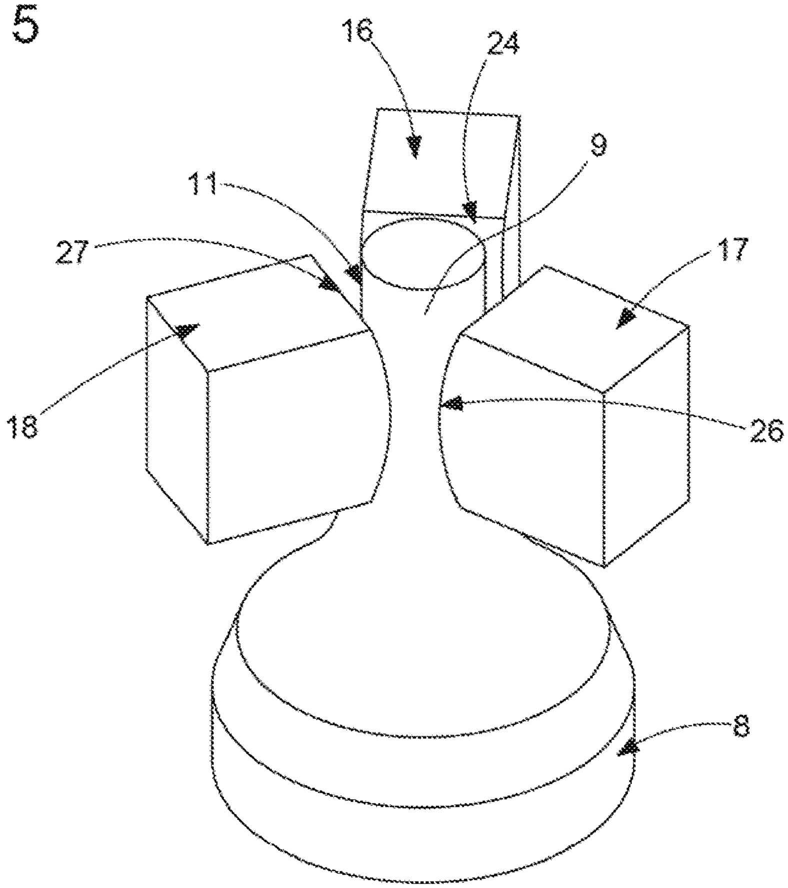
FIG. 5 schematically shows a perspective view of a pivot of a rod inserted into a retention space formed by three bearing parts according to a first embodiment of the invention.
Figure 6:
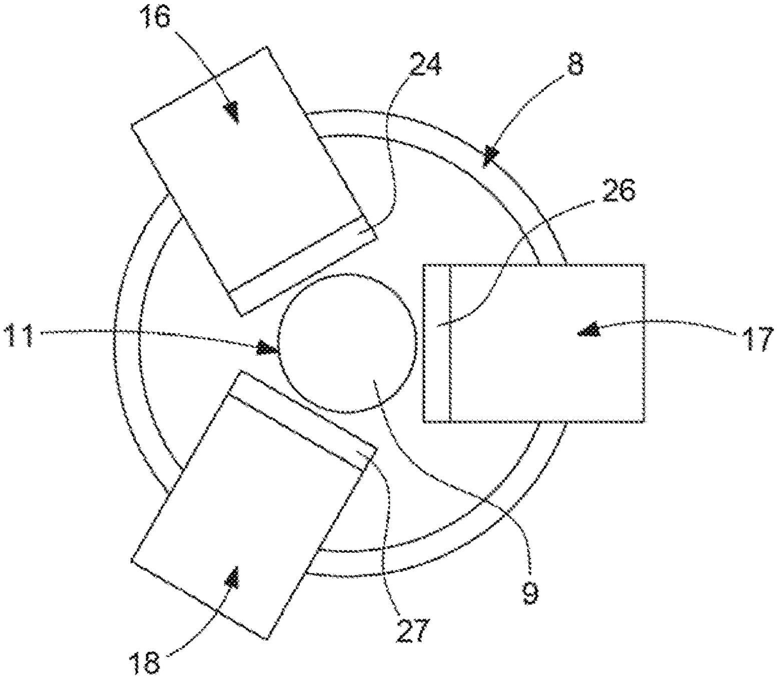
FIG. 6 schematically shows a top view of the drawing of FIG. 5.

FIGS. 5 and 6 show an enlargement of a pivot 9 of a rod 8 maintained by three contact faces 24, 26, 27 of the ends 16, 17, 18 of the bearing parts according to the first embodiment of FIG. 3, the three faces 24, 26, 27 defining in part said radial retention space 11. The dimensions of the retention space 11 are chosen so that the pivot 9 can rotate. Thus, the pivot 9 is not in contact with the contact faces 24, 26, 27 of the three parts simultaneously, otherwise it would be hindered during its rotation. The space 11 defined between the faces 24, 26, 27 has a minimum diameter slightly greater than the diameter of the pivot. Thus, the contact faces 24, 26, 27 radially maintain the pivot 9 so that it remains oriented substantially in the same direction, while letting it rotate.

To avoid a risk of premature wear of the pivot 9 if the rod is slightly inclined, the contact faces 24, 26, 27 include at least one part having a cylindrical shape convex towards the inside of the space 11. The axis of the cylinder is, preferably, substantially perpendicular to the axis of the pivot 9. In this embodiment, the contact faces 24, 26, 27 are each a cylinder portion.

Figure 7:
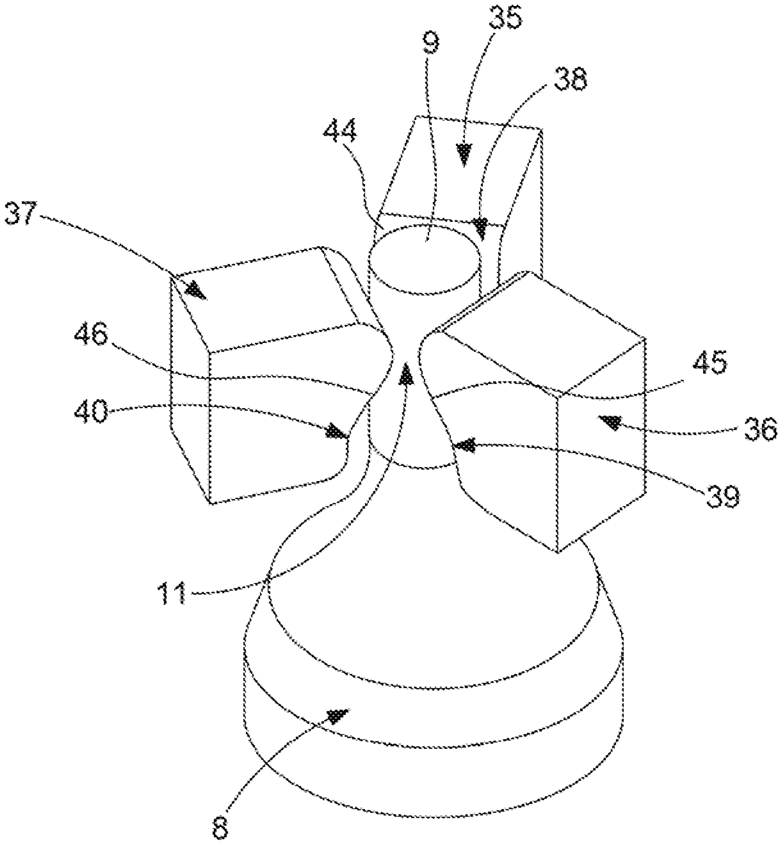
FIG. 7 schematically shows a perspective view of a pivot of a rod inserted into a retention space formed by three bearing parts according to a second embodiment of the invention.

FIG. 7 shows a second embodiment of the contact faces 38, 39, 40 of ends 35, 36, 37, in which the profile of the contact faces 38, 39, 40 is any given curve. These faces each have, however, a locally cylindrical part 44, 45, 46 in the zone of potential contact with the pivot 9. The axis of the cylinder is also in this embodiment substantially perpendicular to the axis of the pivot 9.

In an alternative of the second embodiment, not shown in the images, it is the lower part of the contact face that includes the cylindrical shape extending towards the retention space.

Figure 8:
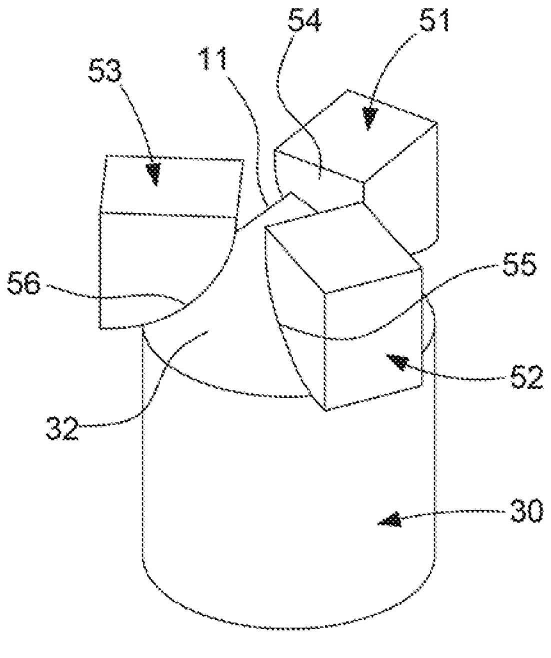
FIG. 8 schematically shows a perspective view of a pivot of a rod inserted into a retention space formed by three bearing parts according to a third embodiment of the invention.

A third embodiment, shown in FIG. 8, involves the cylindrical shape entirely covering the contact face 51, 52, 53 of each end 51, 52, 53 of the bearing part. The profile of the contact face 54, 55, 56 describes a 90° arc of a circle. Thus, the contact face 54, 55, 56 describes the shape of the outer wall of a quarter of a cylinder.

In this third embodiment, the pivot 30 has, preferably, a conical end 32, the contact faces 54, 55, 56 also having a function of forming an axial bearing on the conical peripheral wall of the pivot 30. The base of the cone 32 has a diameter greater than the smallest diameter of the retention space 11. Thus, the pivot 30 cannot go beyond the contact faces 54, 55, 56. Such an embodiment of an assembly formed by such a pivot and by such a guide element allows to do without an endstone to axially block the pivot 30. Indeed, the guide element acts as an axial and radial retainer of the pivot 30.

The second embodiment of the bearing faces can also be used with a conical end of the pivot, to act as an axial bearing in addition to a radial bearing. In this case, it is necessary for the base of the cone of the pivot to have a diameter greater than the smallest diameter of the retention space.

In a first embodiment of the parts, the bearing parts include silicon, each part being made by a deep reactive-ion etching method of the DRIE type.

In a second embodiment, the bearing parts include a metal, for example nickel, the part being made by a lithography-electroplating-moulding method of the LIGA type (for Röntgenlithographie, Galvanoformung, Abformung in German), or by wire erosion.

Naturally, the invention is not limited to the embodiments described in reference to the drawings and alternatives are possible without going beyond the context of the invention. A radial guide element having more than three bearing parts can be made, for example with four, five, six, or even ten or twelve parts, with shapes as described in the embodiments above, but also with other shapes.

The invention claimed is:

1. A guide element for radial guiding of a pivot of a rod of a rotating wheel for a bearing of a shock-absorbing horological movement, the guide element comprising:

a body configured to cooperate with a bearing unit in such a way as to be maintained in the bearing unit, the body defining a space for radial retention of the pivot, to maintain the rod radially while allowing it to rotate, wherein the body includes at least three bearing parts for localized radial bearing distributed angularly, the three bearing parts defining said radial retention space, each bearing part having a face for contact with said pivot, each face locally having a cylindrical shape convex towards the inside of the radial retention space, the bearing parts having an elongated body, wherein a longitudinal axis of the cylinder shape is perpendicular to a longitudinal axis of the pivot, and wherein the elongated body is extended longitudinally by an end including the contact face, the end and the body forming a shoulder.

2. The guide element according to claim 1, wherein the cylindrical shape entirely covers the face of the part.

3. The guide element according to claim 1, wherein the guide element includes silicon, the bearing part being made by a deep reactive-ion etching method of the DRIE type.

4. The guide element according to claim 1, wherein the guide element includes a metal, including nickel, the bearing part being made by a lithography-electroplating-moulding method of the LIGA type.

5. A bearing of shock-absorbing horological movement, comprising a bearing unit, including a radial guide element according to claim 1.

6. The guide element according to claim 1, further comprising a support member for said bearing parts.

7. The guide element according to claim 6, wherein the support member has slots for insertion of a part of the bearing parts, the slots being arranged radially.

8. The guide element according to claim 7, wherein the support member has the shape of a disc, the slots being distributed angularly around the centre of the disc.

9. The guide element according to claim 6, wherein the support member is provided with a through-hole arranged above or below the retention space, the hole being disposed at the centre of the support member.

10. The guide element according to claim 6, wherein the bearing parts are fixed with respect to the support member.

11. A rotary assembly comprising a rotating wheel of an horological movement, the wheel being provided with a pivot, wherein the assembly includes a radial guide element according to claim 1, wherein the pivot is maintained radially while being able to rotate.

12. The rotary assembly according to claim 11, wherein the pivot includes a conical end cooperating with the bearing parts, the base of the cone having a diameter greater than the diameter of the retention space, so that the pivot is also axially maintained by the guide element.

13. A guide element for radial guiding of a pivot of a rod of a rotating wheel for a bearing of a shock-absorbing horological movement, the guide element comprising:

a body configured to cooperate with a bearing unit in such a way as to be maintained in the bearing unit, the body defining a space for radial retention of the pivot, to maintain the rod radially while allowing it to rotate, wherein the body includes at least three bearing parts for localized radial bearing distributed angularly, the three bearing parts defining said radial retention space, each bearing part having a face for contact with said pivot, each face locally having a cylindrical shape convex towards the inside of the radial retention space, the bearing parts having an elongated body, and wherein the elongated body is extended longitudinally by an end including the contact face, the end and the body forming a shoulder.

* * * * *